Figure 1B:
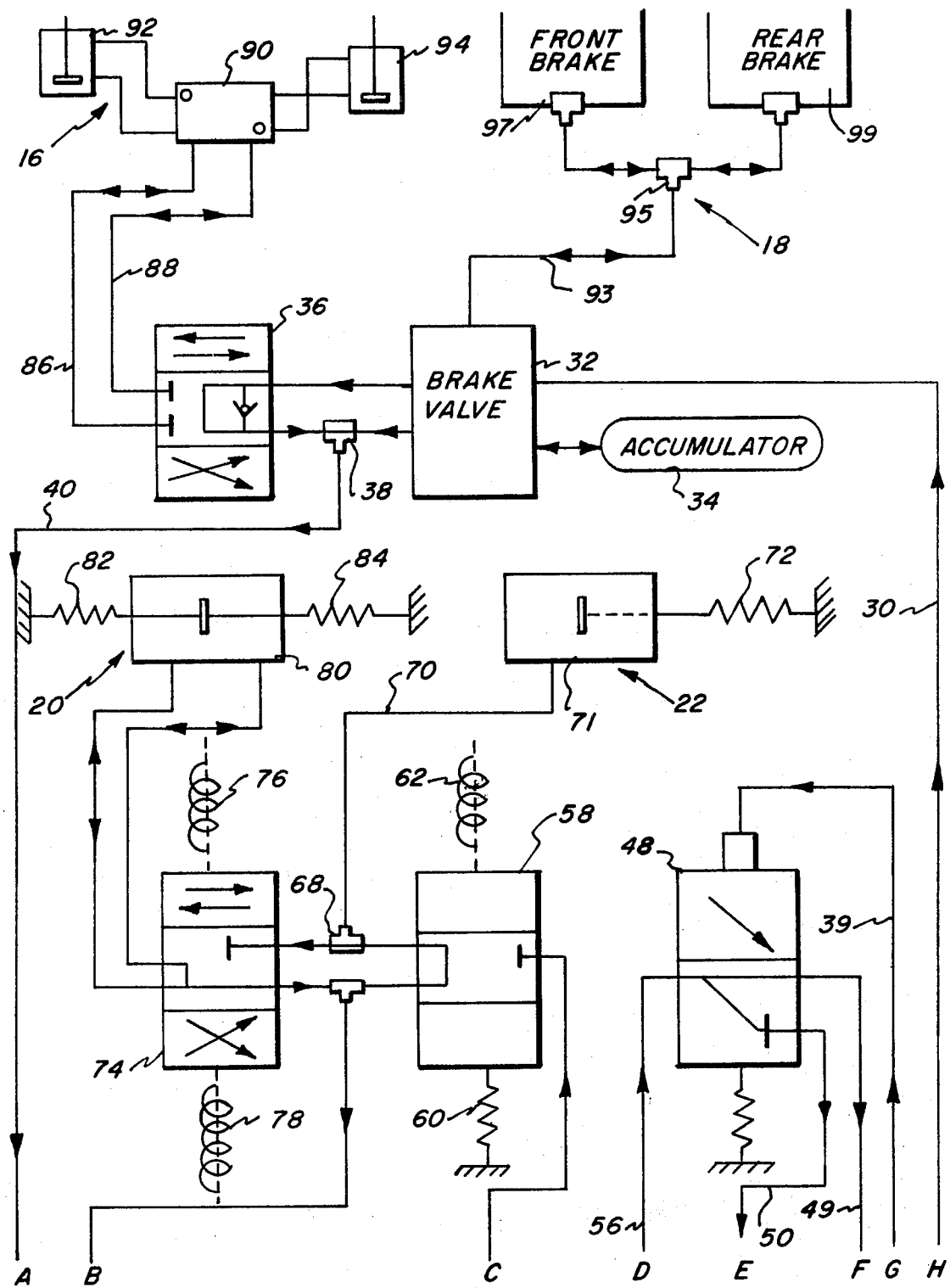

United States Patent
Santos et al.

[15] 3,674,107
[45] July 4, 1972

[54] HYDRAULIC SYSTEM FOR A VEHICLE

[72] Inventors: Gerard R. Santos, Levittown; James M. Herring, Jr., Merion Station, both of Pa.

[73] Assignee: Boothe Airside Systems, Inc.

[22] Filed: Sept. 12, 1969

[21] Appl. No.: 857,427

[52] U.S. Cl. ..........................................180/79.2 R, 60/52 S
[51] Int. Cl. ..........................................................B62d 5/00
[58] Field of Search..................180/79.2 R, 79.2 B; 60/52 S, 60/51; 303/9

[56] References Cited

UNITED STATES PATENTS

| | | | |
|---|---|---|---|
| 2,804,753 | 9/1957 | Leduc | 60/51 X |
| 2,396,984 | 3/1946 | Broadston et al. | 60/51 X |
| 3,148,506 | 9/1964 | Moyer et al. | 60/52 S |
| 3,279,558 | 10/1966 | Allen et al. | 180/79.2 |
| 3,280,557 | 10/1966 | Sattavara | 60/52 S |
| 3,360,925 | 1/1968 | Zimmerman | 180/79.2 B |

*Primary Examiner*—Benjamin Hersh
*Assistant Examiner*—John A. Pekar
*Attorney*—Stowell & Stowell

[57] ABSTRACT

A hydraulic system provides steering, transmission shifting and braking for a vehicle. A first pump provides fluid power for steering and said braking. A second pump provides fluid power for the transmission shifting in the vehicle. Means responsive to the failure of the first pump causes the second pump to provide the power for the steering and braking of the vehicle as well as continuing to apply the power for transmission shifting.

7 Claims, 2 Drawing Figures

HYDRAULIC SYSTEM FOR A VEHICLE

This invention relates to a hydraulic system having particular application in an aircraft transfer vehicle of the type illustrated and described in U.S. Pat. No. 3,537,745 entitled "Aircraft Transfer Vehicle", which is assigned to the same assignee as the present invention. In this patent, a vehicle for transporting passengers between a terminal building and a parked aircraft is illustrated having a chassis with a passenger pod mounted for up and down lifting movement on a vertical post.

The vehicle described in the aforementioned patent is designed to travel relatively short distances and carry a large number of people. In such a vehicle, the safety of the passengers is of prime importance. At the same time, during normal operation, relatively smooth operation of the steering and braking mechanisms is important to the comfort of the passengers.

In the event of an emergency, as for example the failure of the propulsion engine driving the vehicle, it is important that various functions relating to braking and steering be continued. This is especially important because the vehicle may be in close proximity to an aircraft or a terminal in an airport.

Also, because the vehicle involved may be very close to a plane or airport terminal building, means should be provided to assure that the transmission mechanism is in neutral prior to the starting up of the vehicle. Further, it is important that an automatic parking braking mechanism be provided which is normally operative to brake the vehicle until an operator releases it.

It is an object of this invention to provide an improved hydraulic system wherein power steering and braking of a vehicle may continue to be accomplished after failure of the propulsion engine.

It is an object of this invention to provide an improved hydraulic system capable of performing emergency functions in a vehicle when the main source of power for performing these functions fails.

It is still a further object of this invention to provide an improved hydraulic system wherein emergency brake means are automatically applied when the source of power for providing transmission shifting in a vehicle fails.

In accordance with the present invention, a hydraulic system provides power to a steering, braking, transmission shifting and parking brake mechanisms in a vehicle. A first source of pressurized fluid is connected to control the steering and braking mechanisms of the vehicle. A second source of pressurized fluid is connected to control the transmission shifting and parking brake mechanisms of the vehicle. A normally open valve is connected between the second source of pressurized fluid and the steering and braking mechanisms. The first source of pressurized fluid closes the normally open valve. The second source of pressurized fluid controls the steering and braking mechanisms in the event of pressure failure in the first source while continuing to control the transmission shifting and parking brake mechanisms of the vehicle.

Figure 1A:
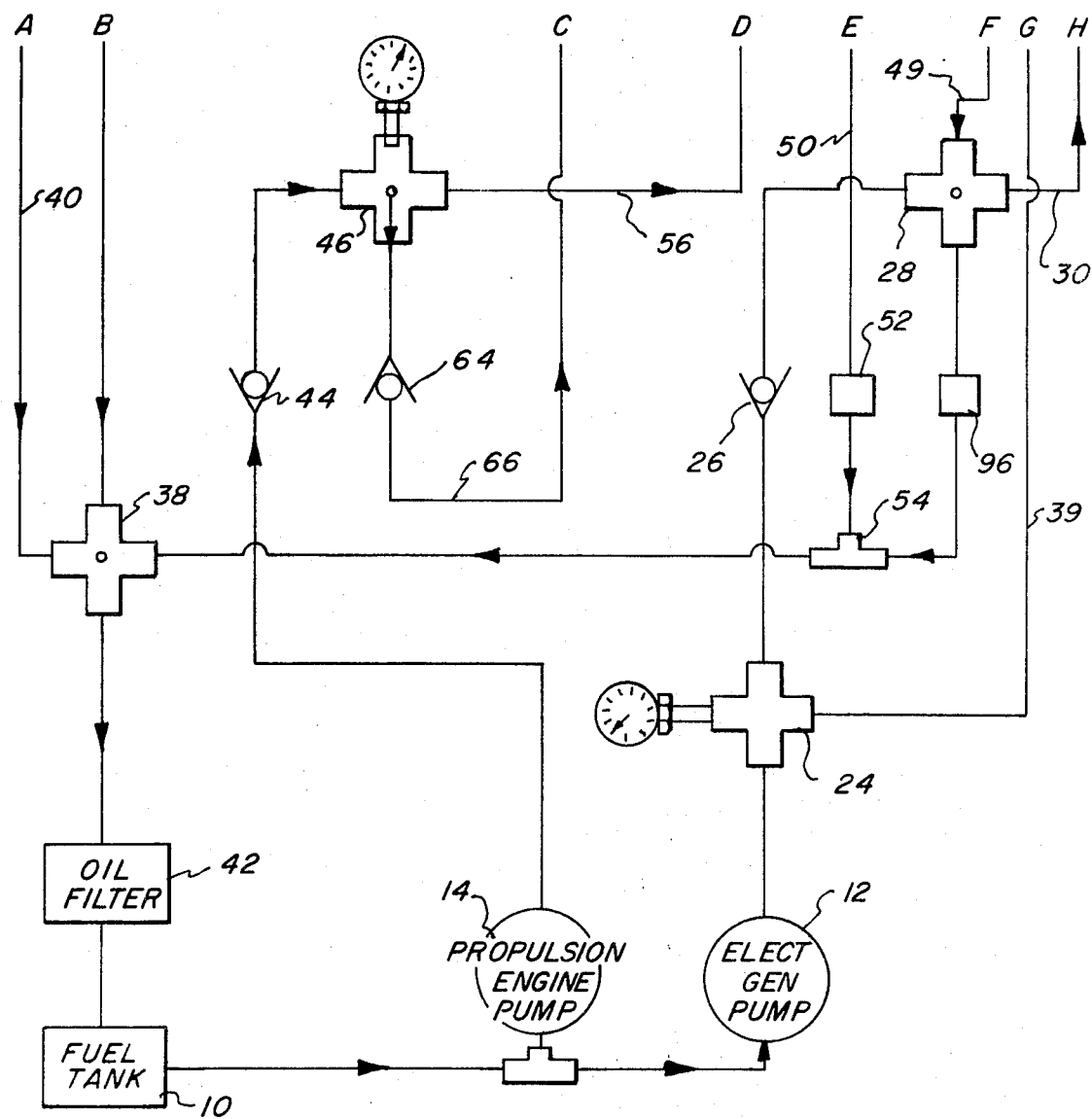

Other objects and advantages of the present invention will be apparent and suggest themselves to those skilled in the art, from a reading of the following specification and claims, in conjunction with the accompanying drawing, in which FIGS. 1a and 1b of the drawing illustrates a hydraulic system for use with a vehicle.

FIGS. 1a and 1b of the drawing include two pages which may be aligned one over the other to illustrate the complete hydraulic mechanism. The letters A-H on the top of one sheet should be aligned with the letters A-H on the bottom of the other sheet.

In describing the subject invention in connection with the accompanying drawing, various symbols are employed which are standard in the industry and well known to those skilled in the art. For example, the various fluid operated devices employed are best illustrated by symbols which have been adopted by the American Standards Association, now known as U.S.A. Standards Institute. Various fittings or connectors are shown in a conventional manner, with various conduits including arrows to indicate the direction of fluid flow. Other elements, for example, such as bias springs and electrical coils are shown schematically because they are well known to those skilled in the art and only incidentally related to the subject invention.

Generally, the present invention involves a main source of fluid and two independent pump means for pressurizing this fluid. The first pump is actuated by an electric generator normally used to provide lighting and other functions within the vehicle. The second pump is driven by the propulsion engine driving the vehicle.

The pump driven by the electric generator is used to actuate the steering and braking mechanisms of the vehicle. The second pump is normally used to actuate the transmission shifting mechanism of the vehicle and to release the parking brake of the vehicle.

First consider a situation in which both pumps are operating normally with no braking or steering being applied.

Referring to the drawing, a source of fluid 10, which may include a tank filled with a suitable oil, provides fluid to a first pump 12 and a second pump 14. The pump 12 is used to provide pressurized fluid for the steering mechanism 16 and the braking mechanism 18. The pump 14 provides pressurized fluid for the transmission shifting mechanism 20 and the parking brake mechanism 22.

Considering first the pump 12 in connection with the steering mechanism 16 and the brake mechanism 18, pressurized fluid is applied through a fitting 24, a check valve 26, a fitting 28 to a first conduit 30. The oil from the conduit 30 is applied to a power brake valve 32, which normally would be disposed in the cab of the vehicle to be operated by an operator. Fluid for braking is supplied to an accumulator 34. The oil under pressure passes through the power brake valve 32 into the power steering valve 36. With no steering action taking place, the oil passes through the steering valve 36, through a fitting 38, a conduit 40, through an oil filter 42 and back to the tank 10.

The pump 12 also provides a pressurized fluid through a conduit 39 to close a normally open valve 48, i.e. normally open with respect to fluid flown from the pump 14.

At the same time that the pump 12 is operating, the pump 14 applies fluid through a check valve 44, a fitting 46, through a conduit 56 to a normally opened valve 48. When the valve 48 is considered closed by the action of the pump 12 providing pressurized fluid to the conduit 39, pressurized fluid passes through the valve 48, through a conduit 50, through a relief valve 52, a fitting 54, a fitting 38, the filter 42 and back to the tank 10. The normally open valve 48 may be considered as being closed by the action of the pump 12. This is closed with respect to the power provided by the pump 14, as will be described. Thus the valve 48 will be opened or closed dependent upon the operation of the pump 12. The conduit 56 may be considered as an auxiliary conduit, i.e. auxiliary to the main conduit 66 to which the pump 14 is designed to apply fluid pressure, as will be described.

A valve 58 is normally held closed by a spring member 60. Upon application of current to a coil 62, the valve 58 opens. Current may be applied to the coil 62 by an operator actuating a switch on the cab of the vehicle, for example. Then the valve 58 is open, the fluid under pressure from the fitting 46 will be applied through a check valve 64, through the conduit 66, through the valve 58, a fitting 68, the conduit 70 and to the parking brake mechanism 22, which includes a brake cylinder 71. The parking mechanism 22 includes a bias spring 72 which is normally biased to provide a braking action for the vehicle. When fluid is applied through the line 70, the fluid pressure overcomes the spring bias to release the parking brake. This provides a safety feature whereby the parking brake is automatically applied in the event of failure of the propulsion engine driving the pump 14.

When the fluid pressure is available to the parking brake cylinder 71, it also is available to a shifting position valve 74. Upon application of current to one of the coils 76 or 78, as accomplished by an operator in the cab actuating a switch, one of the sides of the transmission cylinder 80 becomes pressurized to shift transmission forward or reverse. If no signal is applied to either of coils 76 or 78, the pressure port is blocked and both sides of the cylinder 80 are open to the oil filter 42 and tank 10 allowing the transmission to shift automatically to neutral. The check valve 64 prevents the pressure from decaying every time the propulsion engine stops. A pair of bias springs 82 and 84 is also provied to normally maintain the transmission valve in a neutral position.

Consider now a situation wherein steering and braking are accomplished.

When steering is accomplished, fluid pressure is applied from the power steering valve 36 through one of the output conduit lines 86 or 88, dependent upon the position of the valve 36. Fluid from one of the lines 86 and 88 is applied to a fluid chamber 90 which is connected to steering cylinders 92 and 94.

The pressurized fluid from the brake valve 32 is applied through a conduit 93, a fitting 95 to front brakes 97 and rear brakes 99. The valve 32 is conventional and available commercially. Because it is known to those skilled in the art and not directly related to the subject invention, its details of operation are omitted.

In connection with the braking action, a volume of oil is kept under pressure, e.g. 1,200 psi, in the accumulator 34. When the pressure in the accumulator 34 drops below a predetermined level, e.g. 840 psi, the power brake valve 32 diverts the oil to restore the higher pressure reacting against a relief valve 96. The accumulator 34 allows several braking cycles after all the pressure supply has ceased. When braking and steering are applied simultaneously, the necessary pressure will be created by blocking automatically the flow of oil thereby forcing the oil against or through the relief valve 96.

Consider now a situation where the pump 12 ceases to operate.

Because there is no pressure applied from the conduit 39 to close the valve 48, the normally open valve 48 opened with respect to fluid from the pump 14. Fluid from the conduit 56 passes through the valve 48, through the conduit 49, through the fitting 28 and through the conduit 30. Because fluid is now applied to the conduit 30, the normal steering and braking actions will continue to operate despite the failure of the pump 12. At the same time, the transmission shifting mechanism and the parking brake mechanism will continue to operate in the same manner as previously described.

Consider now a situation in which the pump 14 fails to operate.

The steering and braking mechanisms will continue to operate because the pump 12 continues to operate. However, the transmission shifting mechanism 20 will automatically go to neutral because no fluid power is applied thereto. At the same time, the parking brake mechanism 22 will be applied because no fluid power is applied to the cylinder 71 to overcome the bias pressure from the spring 72.

If the propulsion engine stops, the transmission shifting mechanism 20 will stay in neutral and the parking brake will be applied regardless of any operation by the operator in the vehicle. The operator will not be able to restart the engine if the transmission shifting control is not in neutral.

It is thus seen that the present invention has provided two systems for producing pressurized fluid. The first system involving an electric generator which provides a relatively constant flow of fluid. This is important for smooth power steering and braking when the vehicle is travelling at a relatively high speed.

The provision of the two pumping mechanisms also provides for greater safety in the vehicle. The reason for this is that the steering and power mechanisms will continue to function despite the failure of one of the pumping mechanisms.

What is claimed is:

1. A hydraulic system for providing power to a vehicle having braking, steering, and transmission shifting mechanisms operated by hydraulic power, said system including:
   a. a first source of pressurized fluid,
   b. hydraulically actuated vehicle steering and braking mechanisms having a (first) hydraulic power conduit leading thereto from said source, and normally continuously actuated therefrom,
   c. a second source of pressurized fluid,
   d. a hydraulically actuated vehicle transmission shifting mechanism having a (second) hydraulic power conduit leading thereto from said second source, and normally continuously actuated therefrom, said transmission mechanism shifting to neutral upon loss of hydraulic pressure.
   e. a normally open valve connected between the pressure output of said second source and said steering and braking mechanisms,
   f. means actuated by the pressure output of said first source to close said normally open valve.

2. The hydraulic mechanism of claim 1, including:
   a. a parking brake mechanism which normally performs a braking action when not supplied with pressurized fluid,
   b. said parking brake mechanism hydraulically connected to said second source and receiving pressurized fluid therefrom.

3. The hydraulic mechanism of claim 2, wherein said first and second sources of pressurized fluid are pumps feeding from a common fluid reservoir.

4. The hydraulic mechanism of claim 2, including a relief valve hydraulically coupled to the input side of said steering and braking mechanisms, to thereby limit pressure applied thereto.

5. The hydraulic system of claim 2 including an accumulator hydraulically coupled to said hydraulically actuated braking mechanism, whereby fluid is available for the braking function when required a number of times over short duration.

6. The hydraulic system of claim 2 including a check valve in, respectively, said first and second hydraulic power conduits, to prevent back pressure from being applied to the first and second sources.

7. The hydraulic system of claim 1, including:
   a. a normally closed valve connecting said second source to said transmission shifting mechanism,
   b. means for holding said normally closed valve open.

* * * * *